US010228067B2

(12) United States Patent
Miller et al.

(10) Patent No.: US 10,228,067 B2
(45) Date of Patent: Mar. 12, 2019

(54) VALVE ASSEMBLY FOR INFLATABLE BODIES

(71) Applicant: Übertüb Inc., Barrie (CA)

(72) Inventors: Steven Earl Miller, Barrie (CA); Ian Scott McCrindle, Minesing (CA)

(*) Notice: Subject to any disclaimer, the term of this patent is extended or adjusted under 35 U.S.C. 154(b) by 0 days.

(21) Appl. No.: 15/411,309

(22) Filed: Jan. 20, 2017

(65) Prior Publication Data

US 2017/0211713 A1    Jul. 27, 2017

Related U.S. Application Data

(60) Provisional application No. 62/281,428, filed on Jan. 21, 2016.

(51) Int. Cl.
*F16K 15/20*    (2006.01)

(52) U.S. Cl.
CPC .......... *F16K 15/207* (2013.01); *F16K 15/202* (2013.01); *F16K 15/205* (2013.01); *Y10T 137/374* (2015.04)

(58) Field of Classification Search
CPC ...... F16K 15/207; F16K 15/14–15/148; F16K 15/202; F16K 15/205; Y10T 137/3584–137/3786; Y10T 137/87917; Y10T 137/374
USPC ..... 137/223, 232–234, 512.2, 512.15, 512.4, 137/506, 859, 860
See application file for complete search history.

(56) References Cited

U.S. PATENT DOCUMENTS

| | | | | |
|---|---|---|---|---|
| 1,156,328 A | * | 10/1915 | Thayer | F16K 15/20 137/226 |
| 2,328,382 A | * | 8/1943 | Langdon | F16K 15/147 137/218 |
| 2,701,579 A | * | 2/1955 | Hasselquist | F16K 15/202 137/223 |
| 2,725,075 A | * | 11/1955 | Irgens | F02D 9/18 137/512.1 |
| 2,736,333 A | * | 2/1956 | Hancox | F16K 21/04 137/232 |
| 2,772,692 A | | 12/1956 | Russell | |
| 2,804,085 A | | 8/1957 | Di Geambeardino et al. | |
| 3,130,816 A | | 4/1964 | Wright | |
| 3,159,176 A | * | 12/1964 | Russell | B60T 11/28 137/493.1 |
| 3,260,276 A | * | 7/1966 | Stasiunas | F16K 15/20 137/234.5 |
| 3,432,904 A | | 3/1969 | Stewart | |
| 3,903,915 A | * | 9/1975 | Rosaz | F16K 15/20 137/232 |

(Continued)

FOREIGN PATENT DOCUMENTS

WO    2010151576 A1    12/2010
WO    2012177271 A1    12/2012

*Primary Examiner* — Craig J Price (57) ABSTRACT

A valve assembly for inflatable bodies such as a recreational toy, is located in a recessed cup that is flush with the surface of the inflatable body. The cup has a central boss that has both an internal and external thread. The valve assembly is secured to the boss with the internal threads and a cap is secured to the boss with the external threads. The valve assembly provides for inflation using an air hose or a manual inflation device. The valve assembly is removable from the cup to facilitate deflation of the body after use. The cap provides sealing between the cup and valve member to inhibit loss of air.

7 Claims, 9 Drawing Sheets

(56) References Cited

U.S. PATENT DOCUMENTS

| | | | |
|---|---|---|---|
| 3,995,653 A * | 12/1976 | Mackal | F16K 15/202 137/223 |
| 4,030,151 A | 6/1977 | McKeen, Jr. | |
| 4,084,606 A * | 4/1978 | Mittleman | A61M 5/00 137/102 |
| 4,227,525 A * | 10/1980 | Lundquist | A61M 5/165 604/126 |
| 4,766,628 A | 8/1988 | Walker | |
| 5,162,007 A | 11/1992 | Leslie | |
| 5,203,831 A * | 4/1993 | Lind | B63C 9/24 137/1 |
| 5,383,804 A | 1/1995 | Mitch | |
| 5,476,404 A | 12/1995 | Price | |
| 6,010,382 A | 1/2000 | Kennedy | |
| 6,089,251 A * | 7/2000 | Pestel | B63C 9/24 137/232 |
| 6,196,254 B1 | 3/2001 | Shaw | |
| 6,217,401 B1 | 4/2001 | Peterson | |
| 6,331,128 B1 | 12/2001 | Schmick | |
| 6,460,560 B1 * | 10/2002 | Weinheimer | F16K 15/205 137/232 |
| 6,533,254 B1 * | 3/2003 | Grifka | F02M 1/16 123/179.11 |
| 6,648,004 B2 * | 11/2003 | Lau | F16K 15/148 137/223 |
| 6,659,825 B2 | 12/2003 | Foss | |
| D486,757 S | 2/2004 | Peterson | |
| 6,702,635 B2 | 3/2004 | Soares | |
| 6,896,569 B1 | 5/2005 | Wittenrich | |
| 6,935,911 B1 | 8/2005 | Steward | |
| 6,990,994 B2 | 1/2006 | Reeb et al. | |
| 7,066,442 B2 * | 6/2006 | Rose | F16K 15/20 137/223 |
| 7,243,676 B2 * | 7/2007 | Bailey | A61M 39/24 137/493.1 |
| 7,273,065 B1 | 9/2007 | Robbins | |
| 7,410,145 B1 * | 8/2008 | Elze | B65D 81/052 141/350 |
| 7,421,968 B1 | 9/2008 | Hu | |
| 7,438,081 B1 * | 10/2008 | Chen | F16K 15/20 137/223 |
| 7,497,416 B2 * | 3/2009 | Wang | A47C 27/081 137/232 |
| 8,047,886 B1 | 11/2011 | McLarty | |
| 8,187,047 B1 | 5/2012 | Brooks | |
| 8,281,799 B2 * | 10/2012 | Lien | F16K 15/185 137/223 |
| 8,667,982 B2 * | 3/2014 | Song | F16K 15/20 137/232 |
| 2006/0011257 A1 * | 1/2006 | Devall | B60K 15/03504 141/59 |
| 2008/0138211 A1 * | 6/2008 | Mount | F04B 43/0081 417/53 |
| 2014/0054330 A1 * | 2/2014 | Feriani | B65D 51/1644 222/494 |

* cited by examiner

VALVE ASSEMBLY FOR INFLATABLE BODIES

CROSS-REFERENCE TO RELATED APPLICATIONS

This application claims priority to U.S. Provisional Patent Application No. 62/281,428 filed on Jan. 21, 2016, the contents of which are incorporated herein by reference.

FIELD OF THE INVENTION

The present invention relates generally to a valve assembly used to supply and retain a fluid, such as air, to an inflatable body.

BACKGROUND

Recreational products such as tires, rafts, beds, and other like devices need to be inflated before use. Gas, typically air, is supplied under pressure to fill the interior of the body causing it to expand and perform its prescribed function. Once the body has been inflated, it is also necessary to ensure that the air is retained so that the body does not deflate and collapse, rendering it unable to perform its function. Many recreational products are used intermittently so that after use, provision has to be made for the product to be deflated and stored in a compact manner.

Valves are generally well known for the purpose of controlling the flow of a fluid into an inflatable body. For example, U.S. Pat. No. 6,990,994 shows a valve specifically designed for inflatable tubes. It has a sealing disc 300 mounted on the legs of a support spider so that positive pressure will move the disc away from the seat and allow air into the tube. The resilience of the disc moves it back on to the seat to seal the tube. To deflate the tube, the conical support wall of the valve is pushed inwardly, to the position shown in FIGS. 9-12, so the disc is moved away from the seal. A cap 150 is used as a seal for the inflation/deflation passage. Whilst relatively simple, the valve lacks the security and versatility necessary for a recreational product. Moreover, the valve protrudes from the surface and so may be vulnerable and impede the use of the product.

U.S. Pat. Nos. 2,804,085 and 2,772,692 show similar arrangements in which a valve is located in a recessed housing. The valve can be moved between open and closed conditions by rotating a central operating member. In each case, however, the valve is relatively complicated and is intended for use with a specialized adapter.

U.S. Pat. No. 4,766,628 shows a poppet valve assembly with a cupped housing, an insertable check valve, and a threaded cap to hold the body together. However the patent has only a singular annular seal; so that leakage may occur if the seal is damaged.

U.S. Pat. No. 6,196,254 shows an adapter to allow a Schrader type tire valve to be fitted to an existing valve of an inflatable device. However, the air must be retained using the valve on the inflatable device, and the adapter must be removed in order to close the cap.

It is therefore an object of the present invention to obviate or mitigate the above disadvantages.

SUMMARY OF THE INVENTION

Accordingly, the present invention provides a valve assembly for inflatable bodies. The valve assembly comprises a recessed cup with a central boss. The central boss projects out of the base of the cup, while still remaining within the cup. The central boss has both an internal and external thread. The boss receives a check valve, an exemplary embodiment being a Boston valve. The check valve consists of a main valve body having a central bore, and an external threading. A diaphragm is attached to the base of the valve body and acts as the primary seal to restrict air flow through the bore. An adapter is insert-able into the central bore of the main body and functions as a connector between a source for the fluid supply and the valve assembly. Finally a cap with internal threading is threadedly fastened onto the external threads on the central boss of the recessed cup. The cap acts to retain all of the components and also inhibits any dirt or other unwanted particulates from entering the inflatable body. The assembly also sits within the cup to be flush with the surface of the inflatable body.

BRIEF DESCRIPTION OF THE DRAWINGS

An embodiment of the invention will now be described by way of example only with reference to the accompanying drawings in which.

The features of the invention will become more apparent in the following detailed description in which reference is made to the appended drawings.

DETAILED DESCRIPTION OF THE INVENTION

Figure 1:
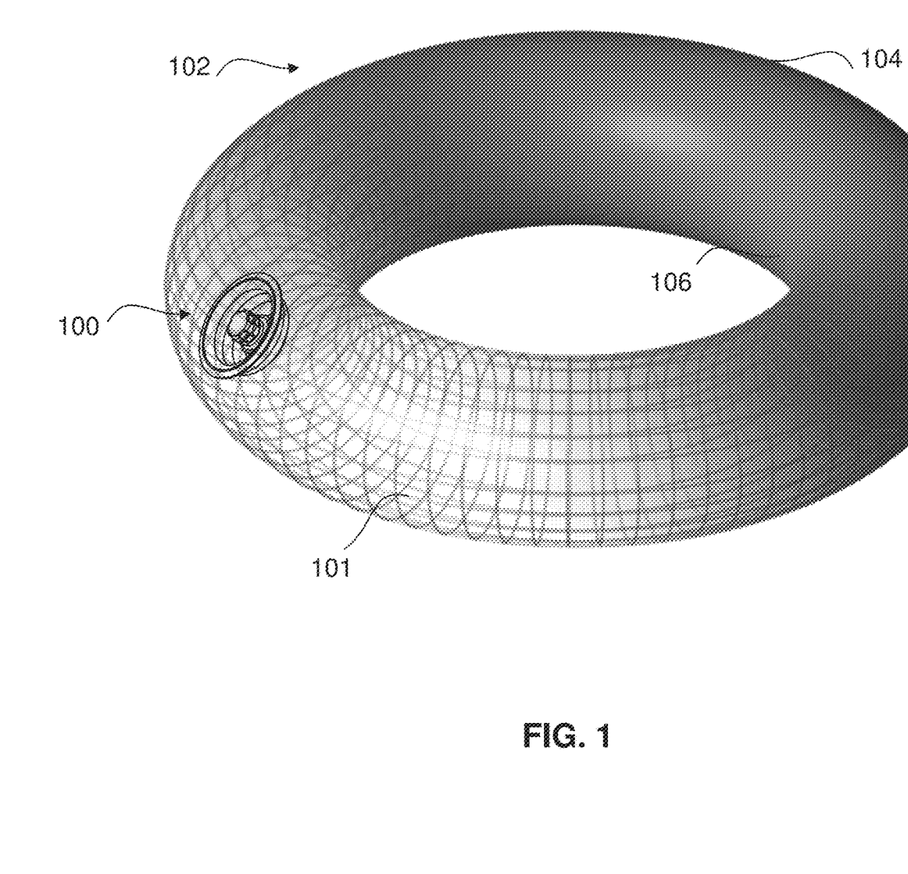
FIG. 1 shows a perspective view of an inflatable tube including a valve assembly

Referring to FIG. 1, a valve assembly 100 is mounted to an inflatable body 102, which in the embodiment shown, is an inflatable toric tube used as a recreational flotation device. The inflatable body 102 has a continuous wall 101 to define the body with a radially inwardly directed surface 106 and a radially outwardly directed surface 104. The valve assembly 100 may be located on either of the surfaces 104, 106 as desired for functional and aesthetic considerations.

Figure 2:
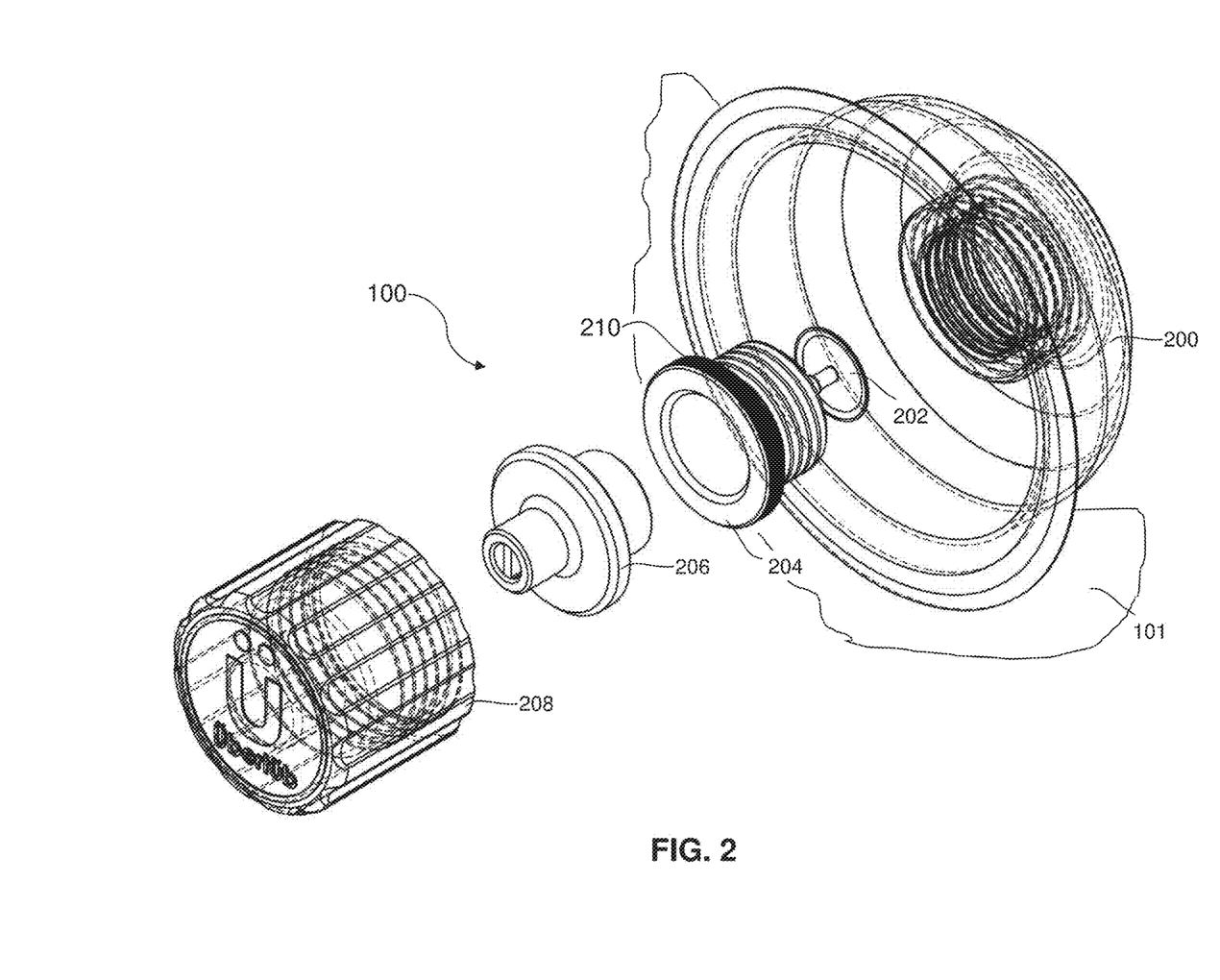
FIG. 2 shows an exploded view of the components of the valve assembly of FIG. 1
Figure 3:
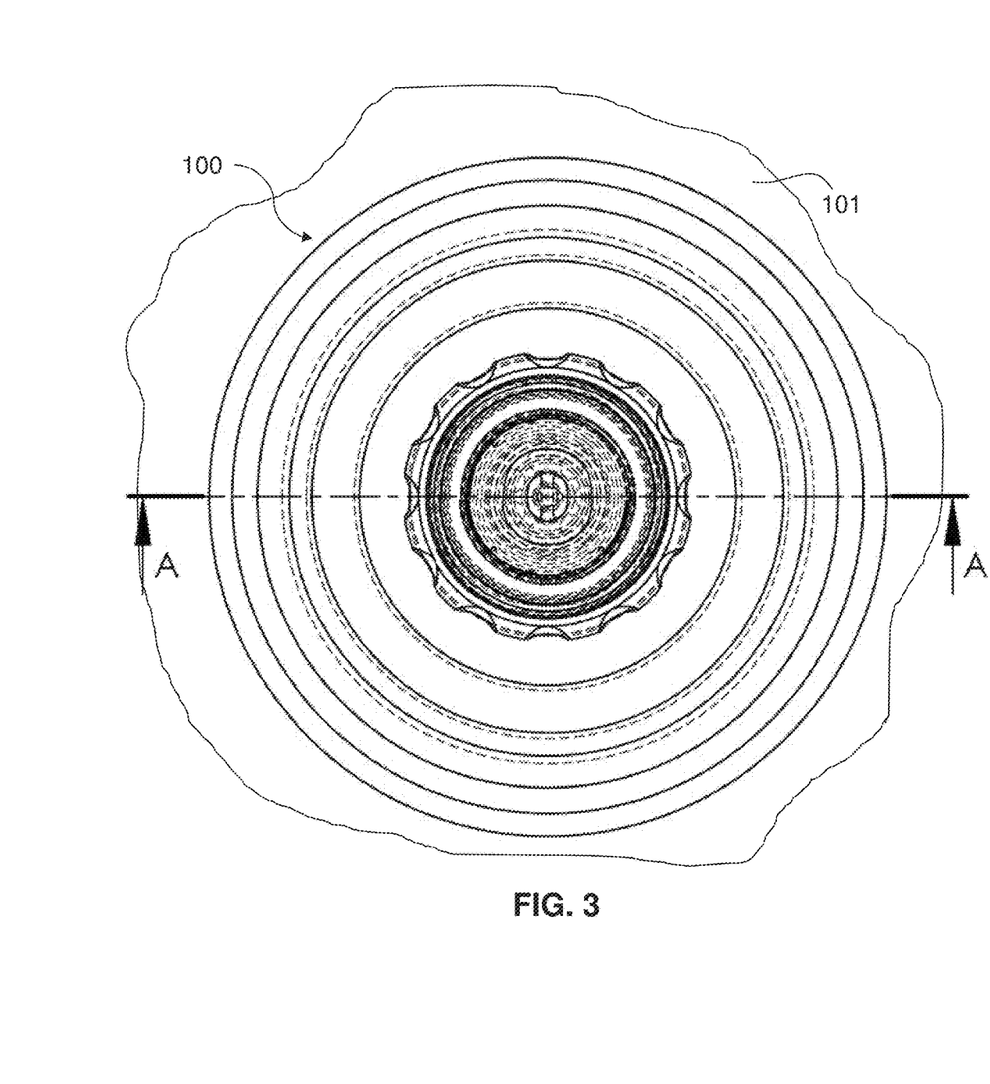
FIG. 3 shows a top view of the valve assembly
Figure 4:
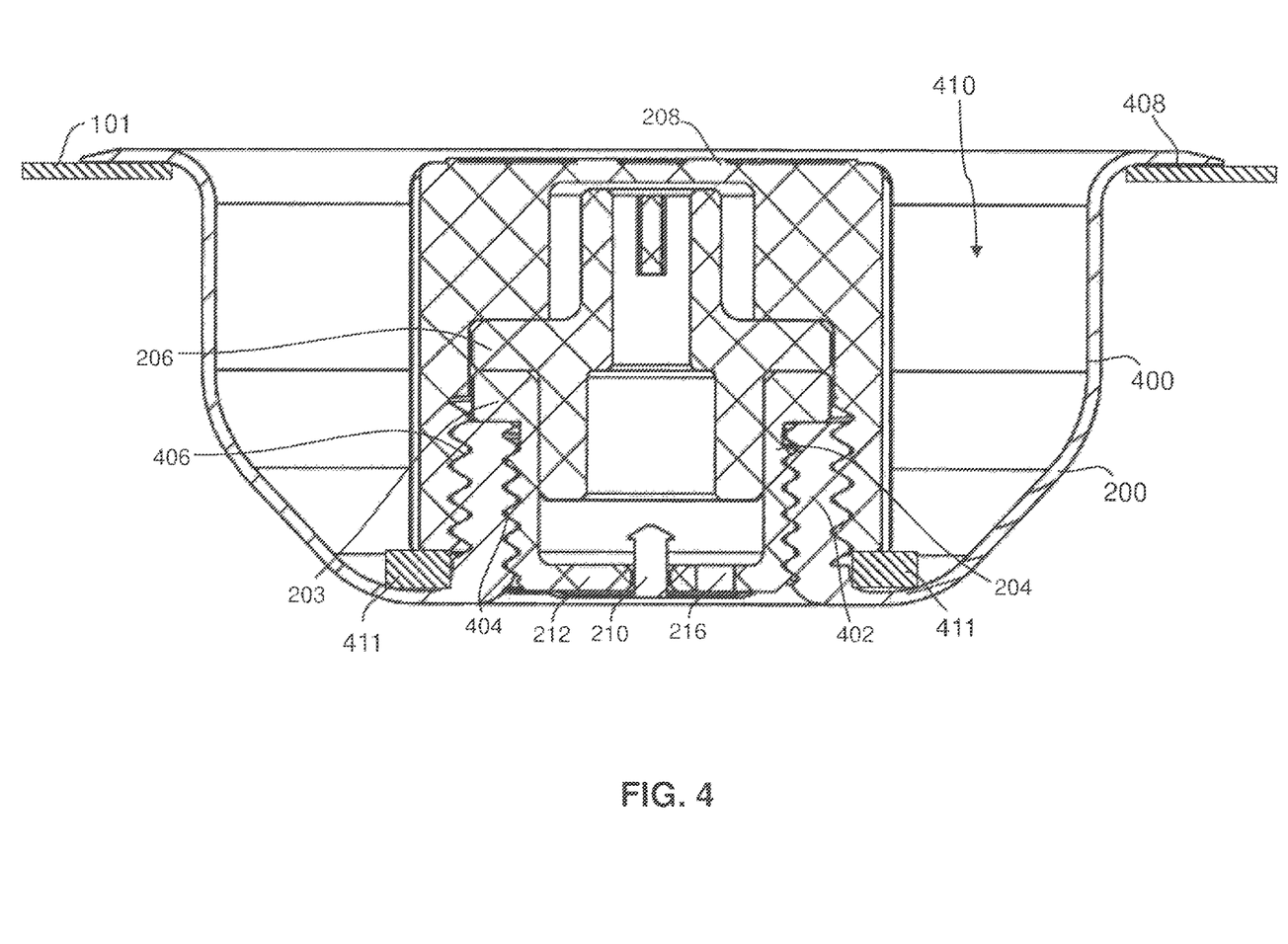
FIG. 4 shows a cross sectional view of FIG. 3 on the line A-A.
Figure 5:
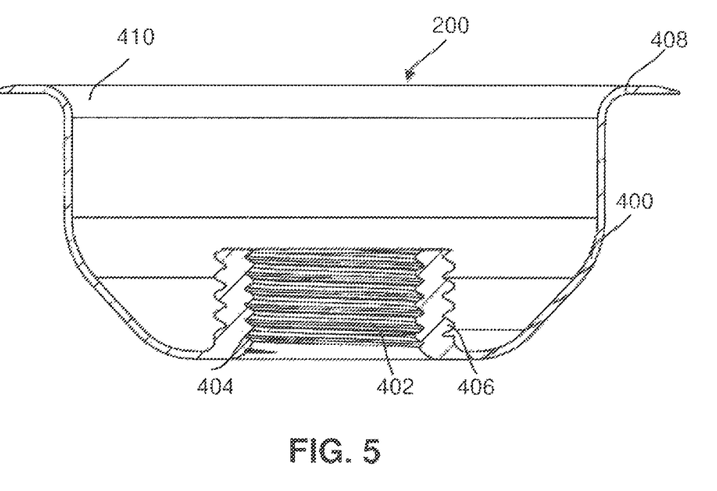
FIG. 5 is a cross sectional view on the line A-A of a cup used in the valve assembly of FIG. 3.

As better seen in FIGS. 2, 4 and 5, the valve assembly 100 includes a recessed cup 200 which is of an upturned frusto-conical shape to form a cavity 410 which can house other components of the valve assembly 100. The cup 200 has a side wall 400 which terminates in a flange 408 near the top of the cup 200. The flange 408 conforms to the curvature of the wall 101 so as to be a smooth joint with the surface 104, 106 and make an airtight connection. The flange 408 is of a saddled shape in the embodiment shown to provide a better fit with the internal radius of the torus-shaped inflatable body. Alternatively, other particular shapes of the inflatable body may require the flange 408 to be of a flat or other shape.

Figure 7:
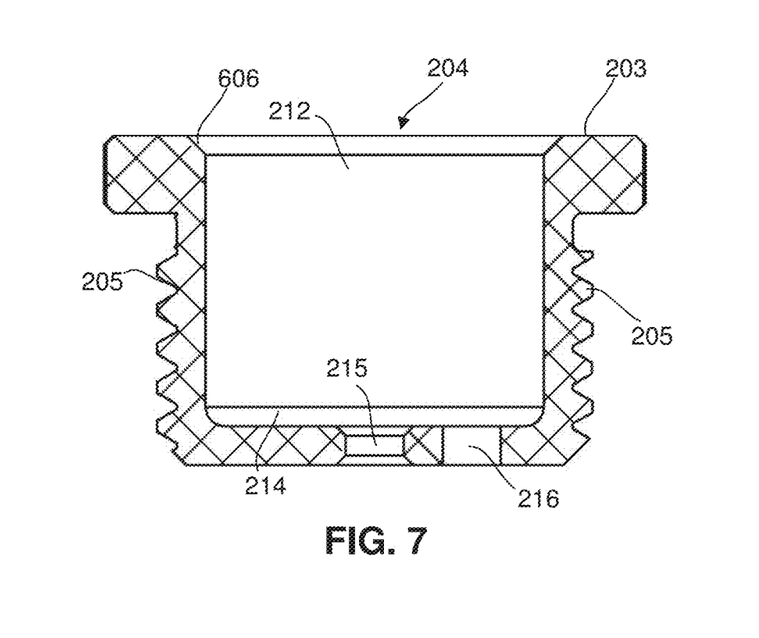
FIG. 7 is a cross sectional view on the line A-A of a valve body used in the valve assembly of FIG. 3.

The recessed cup 200 includes a central boss 402 projecting in to the cavity 410 and having an internal thread 404 and an external thread 406. A valve body 204 has an external thread 205 (FIG. 7) which mates with the internal thread 404 of the boss 402. A flange 203 overlies the end of the boss 204 to limit movement of the body 204 relative to the boss 402. The body 204 has a central bore 212 which is closed by an end wall 214. The end wall 214 includes a central mounting hole 215 and a number of passages 216 arranged in a circular pattern are formed in the end wall 214 to permit flow of air through the end wall 214.

Figure 6:
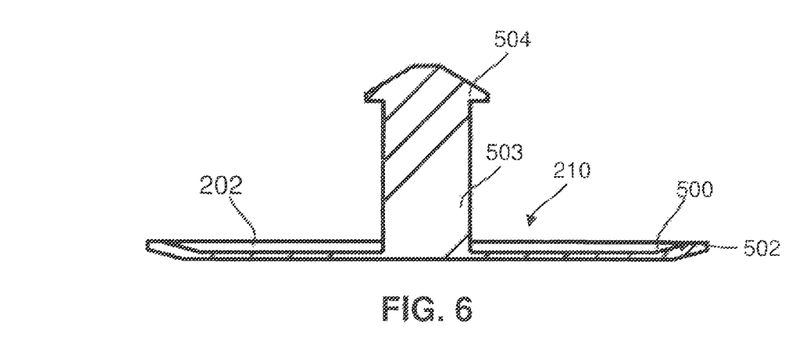
FIG. 6 is a cross sectional view on the line A-A of a check valve used in the valve assembly of FIG. 3.

A check valve 210 is mounted to the end wall 214 to control flow through the passages 216. Referring to FIG. 6, the check valve 210 comprises a resilient diaphragm 202 having a base 500 with an upturned sealing edge 502. A stem 503 projects centrally from the base 500, and terminates in an enlarged head 504. The stem 503 is sized to pass through the hole 215 and be retained on the end wall 214 by the head 504. When mounted, the base 500 overlies the passages 216 and the lip 502 seals against the periphery of the end wall 214.

The central bore 212 is dimensioned to receive a first format of an air supply tube from a low pressure, high volume pump, such as a shop vacuum cleaner, with the check valve controlling air flow in to the inflatable body 102. To facilitate the use of a second format of a air supply, such as conventional tire air supplies, an adapter 206 is provided.

Figure 8:
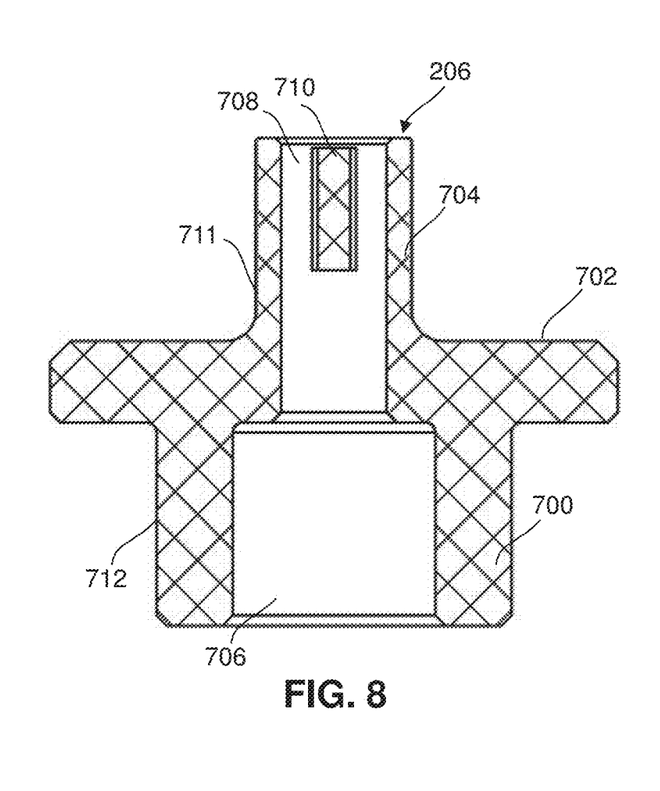
FIG. 8 is a cross sectional view on the line A-A of an adapter used in the valve assembly of FIG. 3.

Referring to FIG. 8, an adapter 206 consists of a lower portion 700, a shoulder 702, and an upper stem portion 704. The lower portion 700 has an internal chamber 706 communicating with a passageway 708 in the upper stem portion 704. The passageway 708 has a spigot 710 located at its top end that is sized and positioned to engage the sealing pin found in a conventional air hose. The spigot 710 is formed as a cross-member which engages the pin on the inflation pump hose. The radially outer surface 711 of the stem portion 704 is sized to fit within the end fitting of the conventional air hose.

The lower portion 700 has an outer surface 712 that is dimensioned to be a snug sliding fit within the bore 212 of the valve body 204. The fit is arranged to allow the adaptor 206 to be slid in to the body or removed from the body manually, but retains a seal between the valve body and adapter during inflation.

Figure 9:
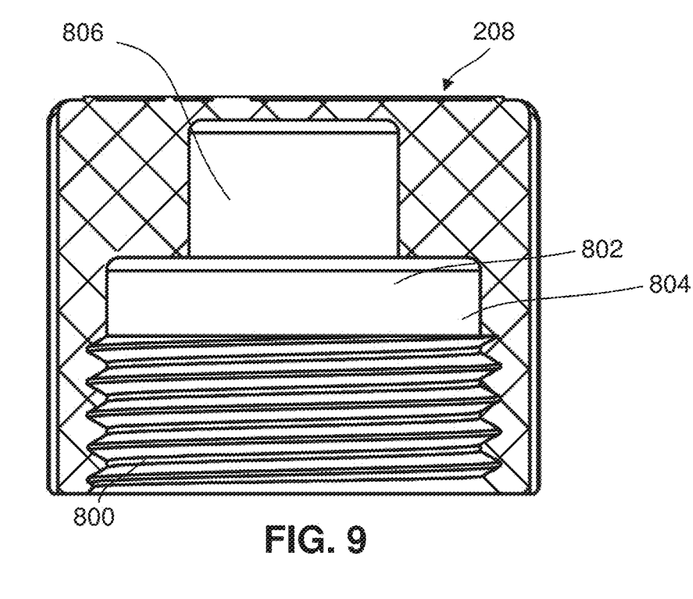
FIG. 9 is a cross sectional view on the line A-A of a cap used in the valve assembly of FIG. 3.

As can be seen in FIG. 9, a cap 208 has a cavity 802 with an internal thread 800. The cavity 802 is counter bored as indicated at 806 to accommodate the adapter 206. The thread 800 is complimentary to the external thread 406, to allow the cap 208 to be secured to the boss 402.

In use the valve body 204 is threaded in to the boss until the flange 203 engages the boss 402. The adapter 206 is mounted in the bore of the valve body and located by the cap 208 which threads on to the external threads 406 of the boss 402. The cap 208 holds the adapter against the flange 203 of the valve body 204 to affect a tight seal between the components. A gasket 411 is placed the base of the external threads 406 of the central boss 402 which provides an airtight seal once the cap 208 has been secured onto the external threads 406. As the cap 208 is tightened onto the central boss, a gasket 411 is compressed forming an airtight seal to inhibit the escape of any air.

With the valve body installed, the diaphragm seals the passages 216 and prevents the escape of air from within the tube 102. The cap is positioned generally below the surface of the wall within the cup, which protects the valve assembly 100 and provides a relatively smooth outer surface for the user.

To inflate the tube 102, the cap 208 is removed and an air hose positioned on the stem 704. The spigot engages the sealing pin in the hose connector and allows air to flow in to the passage 706 and through the check valve 210. The diaphragm is lifted away from the passages 216. Once the tube 102 is inflated, the air hose is removed and the cap replaced. The diaphragm seals against the end wall to close the passages 216 and retain air in the tube. The cap forces the adapter against the end face of the boss to inhibit flow of air past the adapter and provides a further seal zone by engagement with the boss 402.

If an airline is not present, the external surface of the stem 704 allows the tube to be inflated manually, or an alternative fitting for a hand pump or the like. The adapter 206 may be removed to allow a larger diameter inflation tube to be used with a lower pressure, higher volume air supply that seals against the wall of the central bore 212.

When it is desired to deflate the body 100, the user can disassemble components of the valve assembly 100. First, the user removes the cap 208 by twisting it until it disengages from the central boss 402. The adapter 206 is removed from the valve body 204 to give access to the check valve 210 and vent the interior of the body 102. Finally, the user removes the valve body 204 and check valve 210 by disengaging the external threading 600 from the internal threading 404 on the central boss 402 of the recessed cup 200.

Alternatively, the user can also remove both the adapter 206 and valve body as a unit by simply unscrewing the valve body and allowing air to bleed past the threads.

The removal of the valve body 204 exposes the opening of the central boss 402 to the atmosphere, allowing the air to escape the inflatable body 102, causing it to deflate. When the desired level of deflation has been reached, the check valve 210 can be re-attached to the internal threads 404 of the central boss 402. As the check valve 210 is secured, the diaphragm 202 provides a seal against the escape of air.

Figure 10:
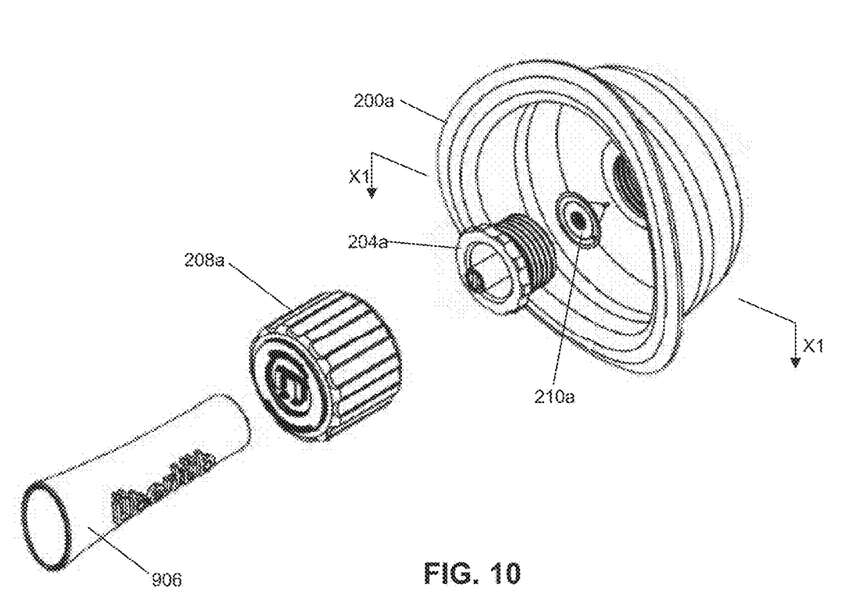
FIG. 10 is an exploded perspective view similar to FIG. 2 of an alternative embodiment of valve assembly, and, FIG. 11 is a section on the line XI-XI of FIG. 10.
Figure 11:
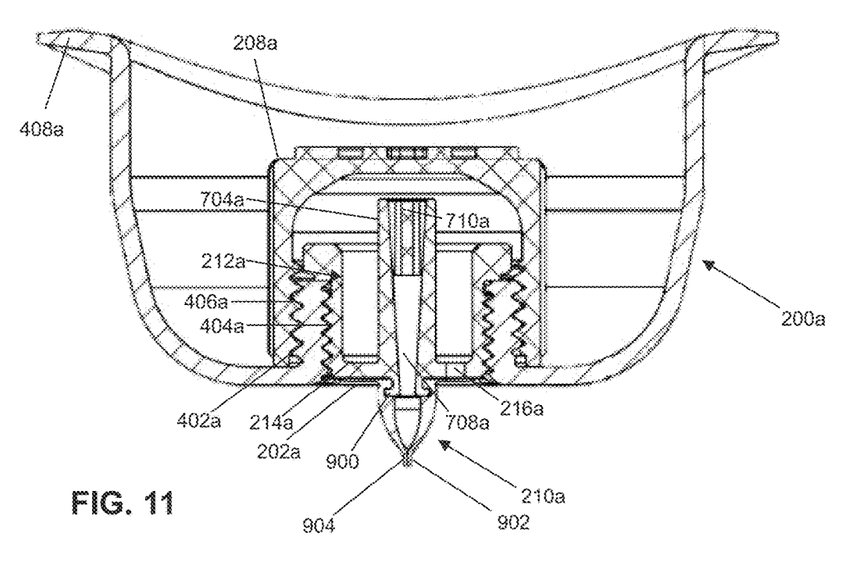

A further embodiment is shown in FIGS. 10 and 11 and like reference numerals are used to describe like components with a suffix "a" added for clarity. Referring therefore to FIG. 10, a cup 200*a* has a peripheral flange 408*a* for attachment to the inflatable body as described above. A boss 402*a* projects upwardly from the base of the cup 200*a* and has internal and external threads 404*a*, 406*a* respectively.

A valve body 204*a* is threaded in to the boss 402*a* and flange 203*a* overlies the end face of the boss 402*a* to provide a sealing surface. As can best be seen in FIG. 11, valve body 204*a* has a central bore 212*a* closed by an end wall 214*a* with air passages 216*a* provided at spaced intervals around the end wall.

A stem 704*a* projects upwardly from the end wall 214*a* and has a passageway 708*a* passing through the end wall 214*a* at its lower end. A cruciform spigot 710*a*, which may extend along the length of the passageway 708*a* to facilitate extraction from a mold if the valve body is molded as one piece, is positioned at the opposite end of passageway 708*a* to lift a check valve in an air hose as described above.

The passageway 708*a* extends through the end wall 214*a* and terminates in an undercut boss 900. A valve member 210*a* is mounted on the boss 900. The valve member 210*a* includes a diaphragm 202*a* that extends radially across the holes 216*a* and an integrally formed "duck-bill" valve 902. The duck-bill valve 902 has a pair of sealing lips 904 depending from the boss 900 that inhibit air flow from within the tube 102 through the stem 710*a*.

In use, the cap 208*a* is removed and pressurised fluid applied to the valve assembly 204*a*. This may be through a conventional air hose with the head of the hose located over the stem 704*a*. The spigot 710*a* is effective to open the check valve in the air hose and allow air to flow along the passageway 708*a*, through the duck-bill valve 902 and into the tube. The diaphragm 202*a* covers the holes 216*a* to retain the air within the tube 102*a*. Alternatively, a "Boston type" fitting may be used to inflate the tube. The fitting includes a tubular inflation tool, 906, FIG. 10, that can be connected to a low pressure pump, such as a shop vacuum cleaner, or manually inflated. The tool 906 is a push fit in to the central bore 212*a* to provide a seal and air is supplied through the passageways 216*a* and/or the passageway 708*a* to the interior of the tube 102*a*.

Once inflated, the air supply is removed and cap 208*a* replaced. The cap 208*a* seals around the boss 402*a* with a gasket 411*a* to ensure a tight seal between the cap 208*a* and cup 200*a*. Any small leakage past the diaphragm 202*a* or valve 902 is contained by the cap 208*a*.

To deflate the tube 102*a,* the cap 208*a* is removed and valve body 204*a* loosened. The air may then bleed past the valve body to remove excess pressure and the valve body then removed completely to allow rapid deflation.

The described design has a number of benefits. Such benefits include the ability to quickly replace any part and ease of operation. As minimal seals are required, the operation and replacement of parts is much simpler and requires less external parts. The design also features the cap 208 which protects the components against the environment, and the compactness of the design allows all of the components of the valve assembly to retain within the cap.

As the adapter and check valve are enclosed within the cap, the entering of any debris, sand, dirt, or other particulates is also inhibited leading to easier maintenance of the valve and the inflatable body. The top of the recessed cup is also flush with the surface of the inflatable body, increasing safety as there are no protruding objects from the valve assembly.

The valve assembly also proves advantageous as the adapter and cap can be assembled at the same time, this again increases compactness and ease of use. The crossmember on the spigot reduces the ability of debris to enter the valve, reducing the possibility of contamination or malfunction due to its ability to activate the pump only during attachment. As the adapter slides into engagement with the valve without any threads, it makes the assembly simple to operate.

The invention claimed is:

1. A valve assembly having a cup defining a cavity, a boss extending into the cavity and having an internally threaded surface and an externally threaded surface, a valve located in said cavity and having an externally threaded valve body received in the internally threaded surface, a stop on said valve body to engage said boss and inhibit movement of said valve body toward said cup whilst permitting removal of said body away from said cup, and a central bore in said valve body, a stem extending through said bore and providing a connection to a first format of air supply, said valve including a check valve secured to said valve body and communicating with said bore to control air flow through said bore, and said valve assembly including a cap having an internal threaded surface for engagement with the externally threaded surface of said boss and seal said bore.

2. The valve assembly of claim 1 wherein a spigot is located in said stem to engage said first format of air supply.

3. The valve assembly of claim 1 wherein said stem is removably secured to said valve body.

4. The valve assembly of claim 1 wherein said bore provides a connection of a second format of air supply.

5. The valve assembly of claim 4 wherein said stem has a passage and an additional valve is connected to said passage to control airflow through said stem.

6. The valve assembly of claim 4 wherein said additional valve extends across said bore to control airflow along said bore.

7. The valve assembly of claim 6 wherein said additional valve comprises a diaphragm extending across an end face of said bore.

* * * * *